(12) United States Patent
Shibasaki

(10) Patent No.: US 10,656,376 B2
(45) Date of Patent: May 19, 2020

(54) LENS APPARATUS AND IMAGE PICKUP APPARATUS

(71) Applicant: CANON KABUSHIKI KAISHA, Tokyo (JP)

(72) Inventor: Go Shibasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 108 days.

(21) Appl. No.: 15/955,901

(22) Filed: Apr. 18, 2018

(65) Prior Publication Data

US 2018/0307003 A1    Oct. 25, 2018

(30) Foreign Application Priority Data

Apr. 20, 2017  (JP) .................................. 2017-083807

(51) Int. Cl.
| | |
|---|---|
| *G02B 15/14* | (2006.01) |
| *G02B 7/10* | (2006.01) |
| *H04N 5/225* | (2006.01) |
| *G02B 9/04* | (2006.01) |
| *G02B 7/04* | (2006.01) |
| *G02B 7/02* | (2006.01) |

(52) U.S. Cl.
CPC ............... *G02B 7/10* (2013.01); *G02B 7/021* (2013.01); *G02B 7/04* (2013.01); *G02B 9/04* (2013.01); *H04N 5/2254* (2013.01)

(58) Field of Classification Search
CPC . G02B 7/10; G02B 7/021; G02B 7/04; G02B 7/022; G02B 7/023; G02B 7/028
See application file for complete search history.

(56) References Cited

FOREIGN PATENT DOCUMENTS

| | | | | |
|---|---|---|---|---|
| JP | H02-058713 | * | 4/1990 | ............... G02B 7/04 |
| JP | H0258713 U | | 4/1990 | |
| JP | H06123829 A | | 5/1994 | |
| JP | H08304688 A | | 11/1996 | |
| JP | 2000266981 A | | 9/2000 | |
| JP | 2010271525 A | | 12/2010 | |
| JP | 2011017769 A | | 1/2011 | |
| JP | 2016138960 A | | 8/2016 | |

OTHER PUBLICATIONS

Office Action issued in Japanese Appln. No. 2017-083807 dated Mar. 19, 2019.

* cited by examiner

*Primary Examiner* — Joseph P Martinez
(74) *Attorney, Agent, or Firm* — Rossi, Kimms & McDowell LLP

(57) ABSTRACT

A lens apparatus of the present invention includes: a first barrel configured not to be moved; a second barrel fitted to an inside of the first barrel and configured to be moved relative to the first barrel; and an elastic member fixed to an outer surface of the first barrel, and biasing an outer surface of the second barrel to an inner surface of the first barrel through a bore formed in the first barrel.

14 Claims, 5 Drawing Sheets

LENS APPARATUS AND IMAGE PICKUP APPARATUS

BACKGROUND OF THE INVENTION

Field of the Invention

The present invention relates to a lens apparatus and an image pickup apparatus.

Description of the Related Art

Conventional known lens apparatuses include one in which when a rotatable barrel is rotated on the inner side of a fixed barrel, a movable lens barrel including multiple cam followers each engaged with guide grooves provided in both the rotatable barrel and the fixed barrel moves forward and backward. In this structure, however, if the eccentricity state of the rotatable barrel relative to the fixed barrel changes inside the fitting play, the orientation of the movable lens barrel changes because the position where the guide groove of the fixed barrel and the guide groove of the rotatable barrel are in alignment with each other differs at each cam follower portion. In the case where the optical performance of the optical system including the movable lens barrel significantly changes with a change in the orientation of an optical element retained by the movable lens barrel, such a change in optical performance attributed to the fitting play of the rotatable barrel is a problem.

To deal with the above problem, Japanese Patent Application Laid-Open No. 2000-266981 discloses a lens barrel in which the fitting play is reduced by elastic members retained between the rotatable barrel and the fixed barrel fitted to each other. In addition, Japanese Patent Application Laid-Open No. 2010-271525 discloses a lens barrel in which the center of a rotatable barrel fitted to the fixed barrel is aligned with a fixed barrel (optical axis) by elastic members provided at equal intervals in a circumferential direction between the rotatable barrel and the fixed barrel.

In the structure disclosed in Japanese Patent Application Laid-Open No. 2000-266981, however, in view of the necessity to retain the elastic member in the small space between the fixed barrel and the rotatable barrel and assemblability, it is impossible to make large the displacement amount of the elastic member in assembling. Therefore, it is inevitably required to use an elastic member having large rigidity (such as spring constant). In the case of using an elastic member having large rigidity, the biasing force generated tends to vary since the deformation amount of the elastic member is changeable due to various factors in assembling. Therefore, it is disadvantageous to stably reduce the play.

Moreover, if elastic members are provided in a circumferential direction at substantially equal intervals as in Japanese Patent Application Laid-Open No. 2000-266981 and Japanese Patent Application Laid-Open No. 2010-271525, the position of the rotatable barrel depends on the equilibrium state of the biasing forces of the elastic members. As a result, when the operating load changes or when an external disturbance such as vibration or impact occurs, the position of the rotatable barrel is unstable, and it may be difficult to maintain stable optical performance.

SUMMARY OF THE INVENTION

The present invention provides, for example, a lens apparatus advantageous in stability of optical performance thereof.

A lens apparatus of an exemplary embodiment includes: a first barrel configured not to be moved; a second barrel fitted to an inside of the first barrel and configured to be moved relative to the first barrel; and an elastic member fixed to an outer surface of the first barrel, and biasing an outer surface of the second barrel to an inner surface of the first barrel through a bore formed in the first barrel.

Further features of the present invention will become apparent from the following description of exemplary embodiments with reference to the attached drawings.

DESCRIPTION OF THE EMBODIMENTS

Hereinafter, a preferred embodiment of the present invention is described in detail based on an example illustrated in FIGS. 1 to 5.

Figure 2:
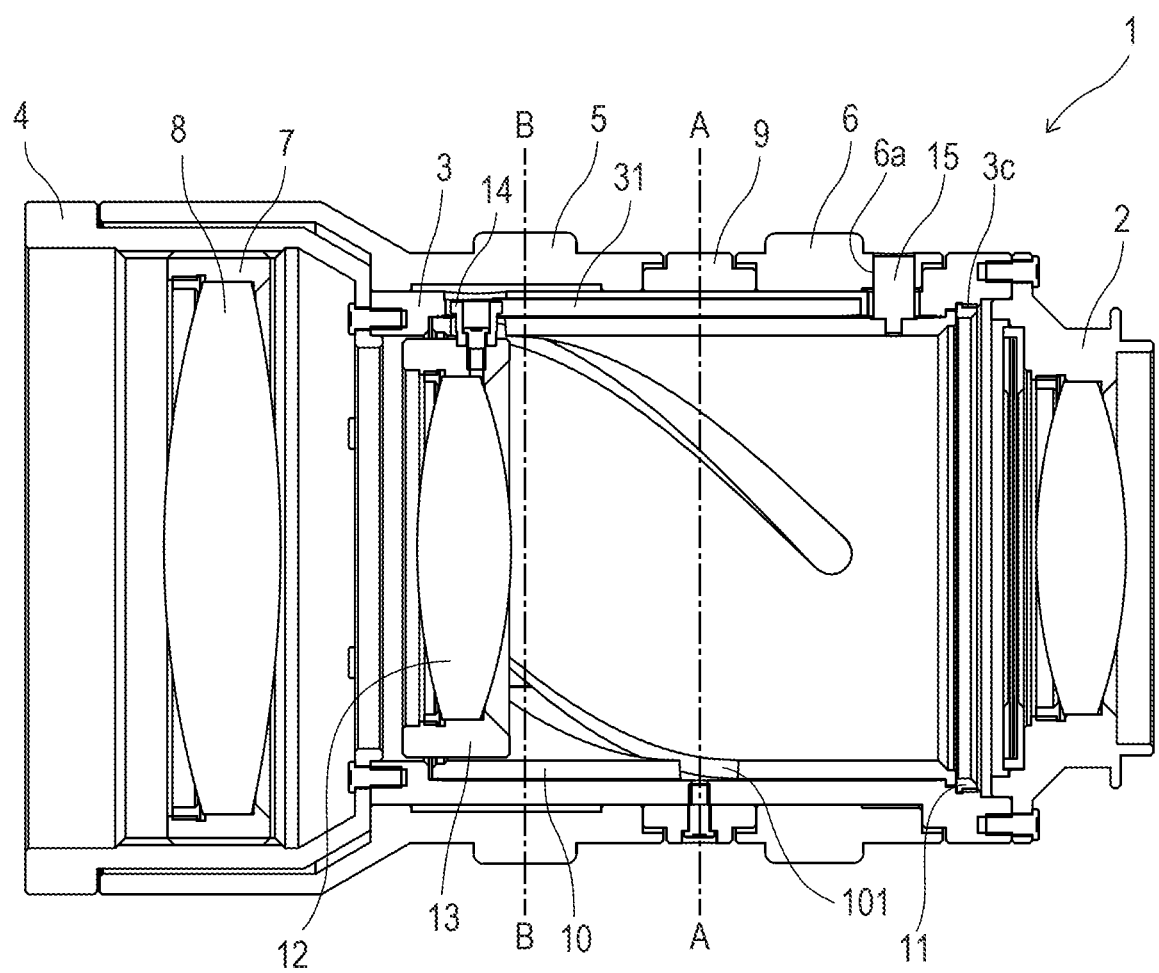
FIG. 2 is a side cross-sectional view of an entire lens apparatus.

FIG. 2 is a side cross-sectional view of a lens apparatus 1 to which the present invention is applied. In the figure, the left is the object side and the right is the image plane side.

In the lens apparatus 1 of the present invention, a mount 2 to be connected to the not-illustrated image pickup apparatus is joined to a fixed barrel (first barrel) 3, and a female helicoid 4 is joined to the object side of the fixed barrel 3. On the outer circumferential portion of the fixed barrel 3, a focus manipulation ring 5 and a zoom manipulation ring 6 are engaged with each other, which are configured to smoothly turn about the optical axis.

The rotation of the focus manipulation ring 5 is transmitted to a male helicoid 7 via a not-illustrated joint pin and is converted to the movement in an optical axis direction of an optical element 8 which is a focal-point-adjusting optical system retained by the male helicoid 7. An index line ring 9 fixed between the focus manipulation ring 5 and the zoom manipulation ring 6 limits the positions in the optical axis direction of the focus manipulation ring 5 and the zoom manipulation ring 6, and the outer circumferential portion thereof is provided with index lines to align with focus indices engraved in the focus manipulation ring 5.

On the inner side of the fixed barrel 3, a cam ring (second barrel) 10 is engaged with the fixed barrel so that the cam ring is turnable relative to the fixed barrel, and the position of the cam ring in the optical axis direction is limited by a pressing ring 11 for a cam ring threadly engaged with a screw portion 3c on the inner circumference of the fixed barrel 3. The fixed barrel 3 is provided with three (multiple) straight guide grooves (first guide grooves) 31, and the cam ring 10 is provided with three (multiple) cam grooves (second guide grooves) 101. The inner side of the cam ring 10 is provided with a moving barrel 13 which retains an optical element 12 being a zooming optical system, and three cam followers 14 fixed to the outer circumferential portion of the moving barrel 13 are slidably engaged with the straight guide grooves 31 and the cam grooves 101 described above. In addition, a joint pin 15 fixed to the cam ring 10 is engaged with an engagement bore 6a of the zoom manipulation ring. The zoom manipulation ring 6 is engraved with zoom indices, and the outer circumferential portion of the fixed barrel 3 is provided with index lines to align with the zoom indices.

In the above configuration, when the zoom manipulation ring 6 is rotationally manipulated to adjust to a certain focal length, the cam ring 10 fitted to the inner side of the fixed barrel 3 with the aid of joint pin 15 rotates about the optical axis, and the cam followers 14 move to the positions where the straight guide grooves 31 and the cam grooves 101 overlap each other. As a result, it is possible to continuously change the position of the optical element 12 in the optical axis direction.

Figure 1:
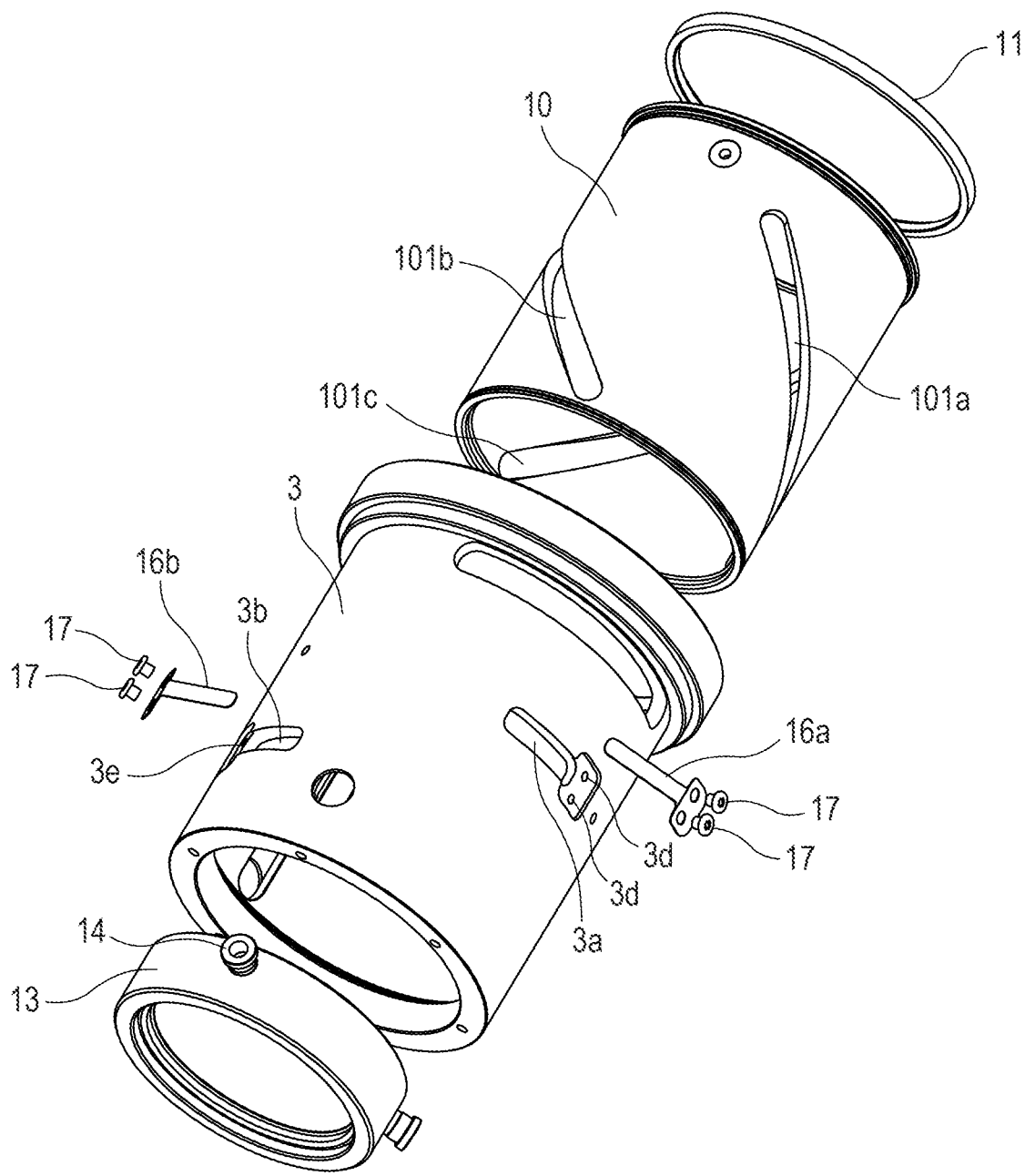
FIG. 1 is an exploded perspective view of a main part of a zooming unit.
Figure 3:
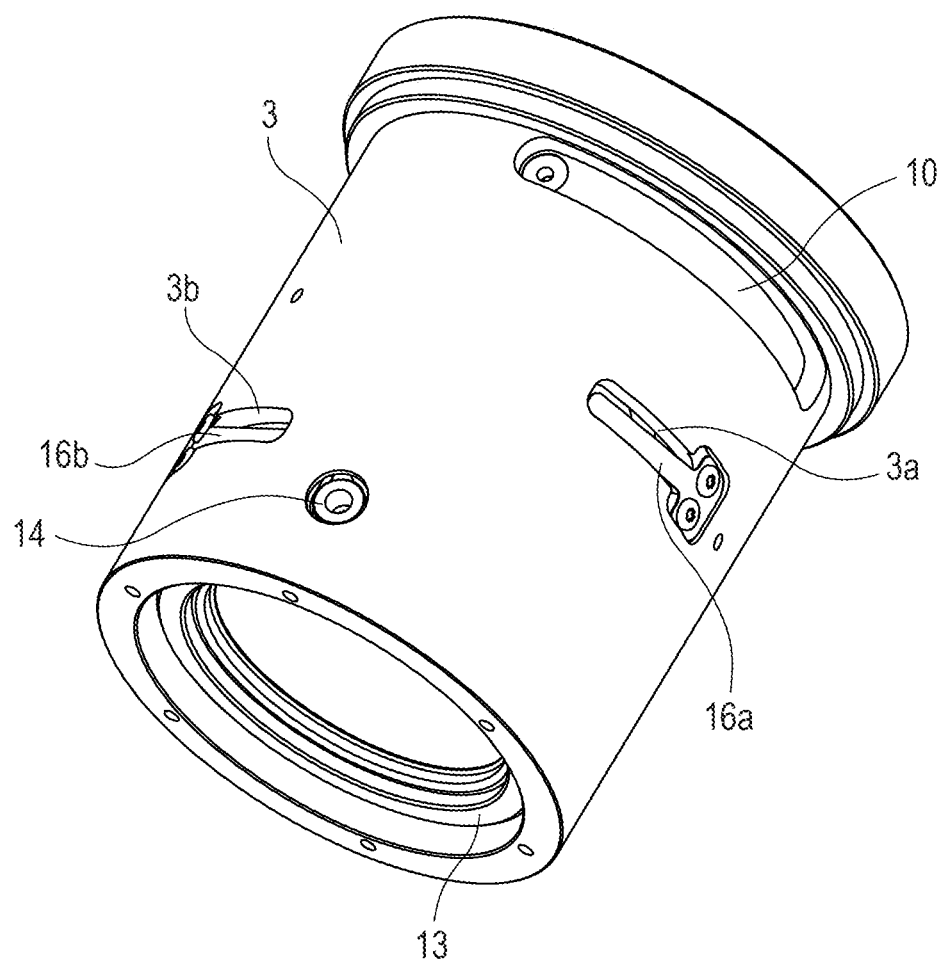
FIG. 3 is a perspective view of a main part of the zooming unit.

Hereinafter, a description is provided for the details in the structure for zooming. FIG. 3 is a perspective view of a main part of the lens apparatus 1 and FIG. 1 is an exploded perspective view of a main part thereof, both of which omit all of the structures on the object side, image plane side, and the outer circumferential side of the fixed barrel 3.

The upper side of the fixed barrel 3 above the optical axis is provided with long bore portions 3a and 3b at two positions which have different phases about the optical axis and different positions in the optical axis direction. Note that the upper side is, in other words, one of the two sides created when dividing the fixed barrel 3 and the cam ring 10 with a plane including the central axis of the fixed barrel 3 or the central (rotational) axis of the cam ring 10 and is the vertically upper side under the conditions of connecting the fixed barrel 3 to the image pickup apparatus and using the image pickup apparatus in the right orientation. Note that the right orientation of the image pickup apparatus specifies the upper side in the design of the image pickup apparatus and is an orientation in which the upper side corresponds to the upper side in the vertical direction in the case of a design where the upper side and the lower side are asymmetric with each other. To further put it differently, the right orientation of the image pickup apparatus is an orientation in which the upper side of the image pickup apparatus corresponds to the vertically upward direction in the case of an orientation assumed as normal use by a user. Examples of the right orientation include, but are not limited to, an orientation in which the shutter button is oriented toward the vertical upper side. Here, the long bore portions 3a and 3b penetrate from the outer circumferential surface to the inner circumferential surface of the fixed barrel 3. Screw bores 3e for fixing the biasing member are provided near one end of the long bore portion 3b, and screw bores 3d for fixing the biasing member are provided near one end of the long bore portion 3a. The long bore portions 3a and 3b are provided with leaf springs (elastic members) 16a and 16b, respectively. Each of the leaf springs 16a and 16b has one end fixed to the outer circumferential side of the fixed barrel 3 by fixing screws 17, and has the other end contacting the cam ring 10 which turns on the inner side of the fixed barrel 3.

Figure 4A:
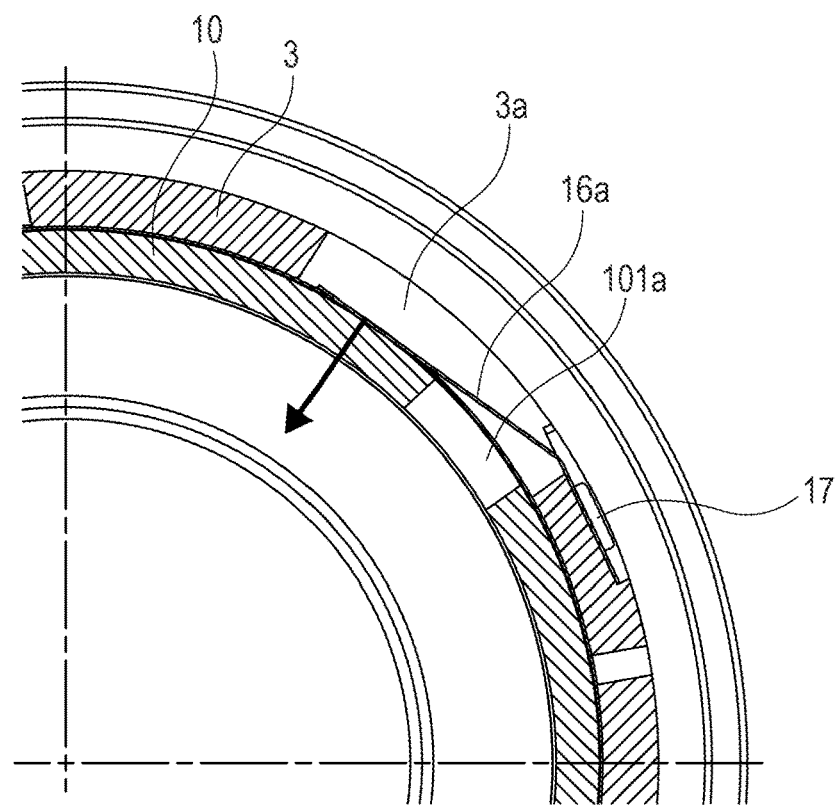
FIG. 4A is a vertical cross-sectional view of a main part of a biasing member.
Figure 4B:
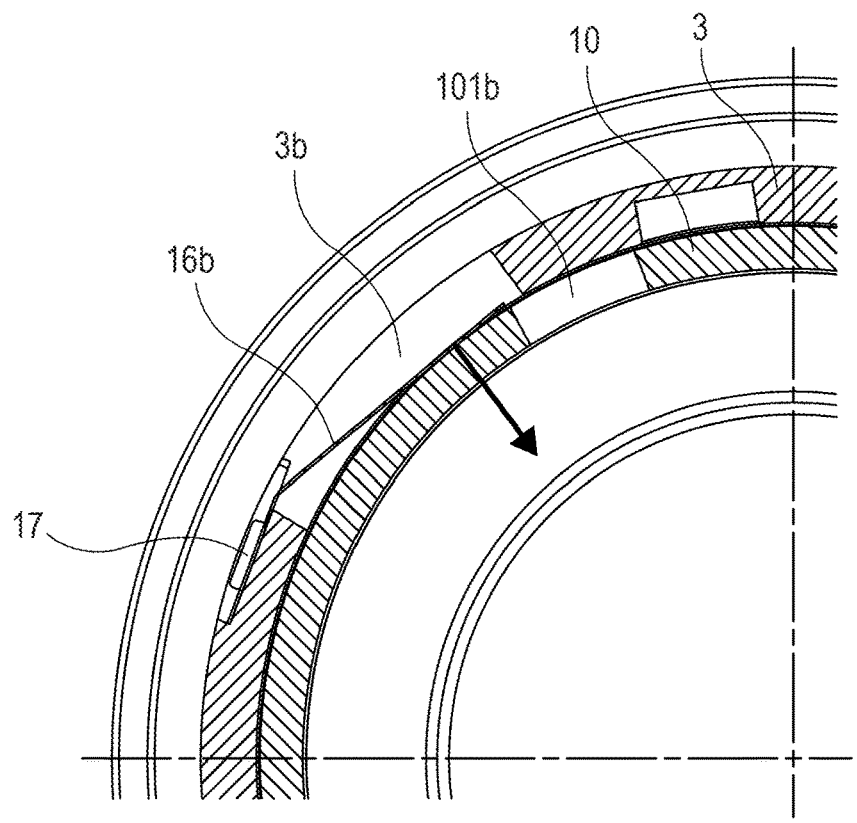
FIG. 4B is a vertical cross-sectional view of a main part of the biasing member.

Here, the portion contacted by the leaf springs 16 is the circumferential surfaces of the cam ring 10 between the adjacent cam grooves 101. To be more specific, the leaf spring 16a contacts the circumferential surface between the cam groove 101a and the cam groove 101b, and the leaf spring 16b contacts the circumferential surface between the cam groove 101b and the cam groove 101c. FIG. 4A is a vertical cross-sectional view of a main part of a contact portion of the leaf spring 16a illustrated along cross-section A-A of FIG. 2, and FIG. 4B is a vertical cross-sectional view of a main part of a contact portion of the leaf spring 16b illustrated along cross-section B-B of FIG. 2. In both of the cross-sections, the directions of the biasing forces generated by the leaf springs 16a and 16b are indicated with arrows. As illustrated in FIGS. 4A and 4B, the leaf springs 16 have a structure to contact (come into sliding contact with) a portion of the outer circumferential surface of the cam ring 10 (on one side of the plane including the axis of the cam ring) which rotates relative to the leaf springs 16, and thereby to press the contact surface. The ideal structure is one which does not apply force in a direction of rotation of the cam ring 10. For this reason, the biasing force generated on the contact surface is oriented in a direction toward the radial center of the cam ring 10 (direction toward the radial center having the optical axis of the lens apparatus substantially at the center) (is biased toward a portion of the inner circumferential surface of the fixed barrel). The angle formed by biasing directions of the leaf springs 16a and 16b at two positions is 90° or less.

In the lens apparatus of the present example configured as described above, the leaf springs provided above the optical axis bias the cam ring to the fixed barrel in the lower direction which is the same as the direction of gravity. This makes it possible to stabilize the position of eccentricity of the rotatable barrel by reducing the engagement play between the fixed barrel and the cam ring. Thus, it is possible to suppress the change in the orientation of the movable lens barrel (moving barrel) and the associated change in the optical performance. In the present example, since the resultant force of the biasing forces generated by the leaf springs at two positions is oriented in a substantially directly downward direction in the figures FIGS. 4A and 4B, the direction of reducing the play of cam ring is also a substantially directly downward direction. Note that in the lens apparatus, the upward and downward directions indicate upward and downward directions assuming a state in which the lens apparatus is most likely used in general, i.e. in which the optical axis is in a substantially horizontal direction. However, the present invention is not limited to the application to a lens apparatus provided in a horizontal direction. If the lens apparatus provided in the horizontal direction is configured such that the resultant force of the biasing forces generated by the leaf springs at two positions is in a substantially vertically downward direction (vertically downward direction), the biasing of the cam ring by the leaf springs at two positions does not defy gravity when the angle (angle of elevation or depression) of the optical axis of the lens apparatus from the horizontal direction is within a range of −90 degrees to 90 degrees. Thus, it is possible to efficiently reduce play.

In addition, the leaf springs which are fixed to the outer circumferential portion of the fixed barrel and which bias the cam ring fitted to the inner side of the fixed barrel have an elastic modulus suppressed at a low level because they can be attached from the outer side of the fixed barrel, which means the displacement amount in the use state can be large, and because their shapes in the longitudinal direction have a higher degree of freedom compared to the case of being provided in a small space. Thus, it is possible to exhibit an effect of stably reducing play because the leaf springs are not easily affected by variation in dimensions and deformation during installment.

In the present example in particular, directional preciseness of reducing play is enhanced by providing the leaf springs at two positions having different phases in the circumferential direction about the optical axis.

In addition, since the above-described biasing positions are provided at two positions distant from each other in the optical axis direction, it is possible to suppress pitch movement of the barrel-shaped cam ring.

Moreover, each of the leaf springs of the present example contacts and biases the circumferential surface of the cam ring between the adjacent cam grooves. For this reason, it is possible to downsize the lens apparatus compared to the case of providing a biasing structure on the object side or the image plane side of the cam grooves.

Figure 5:
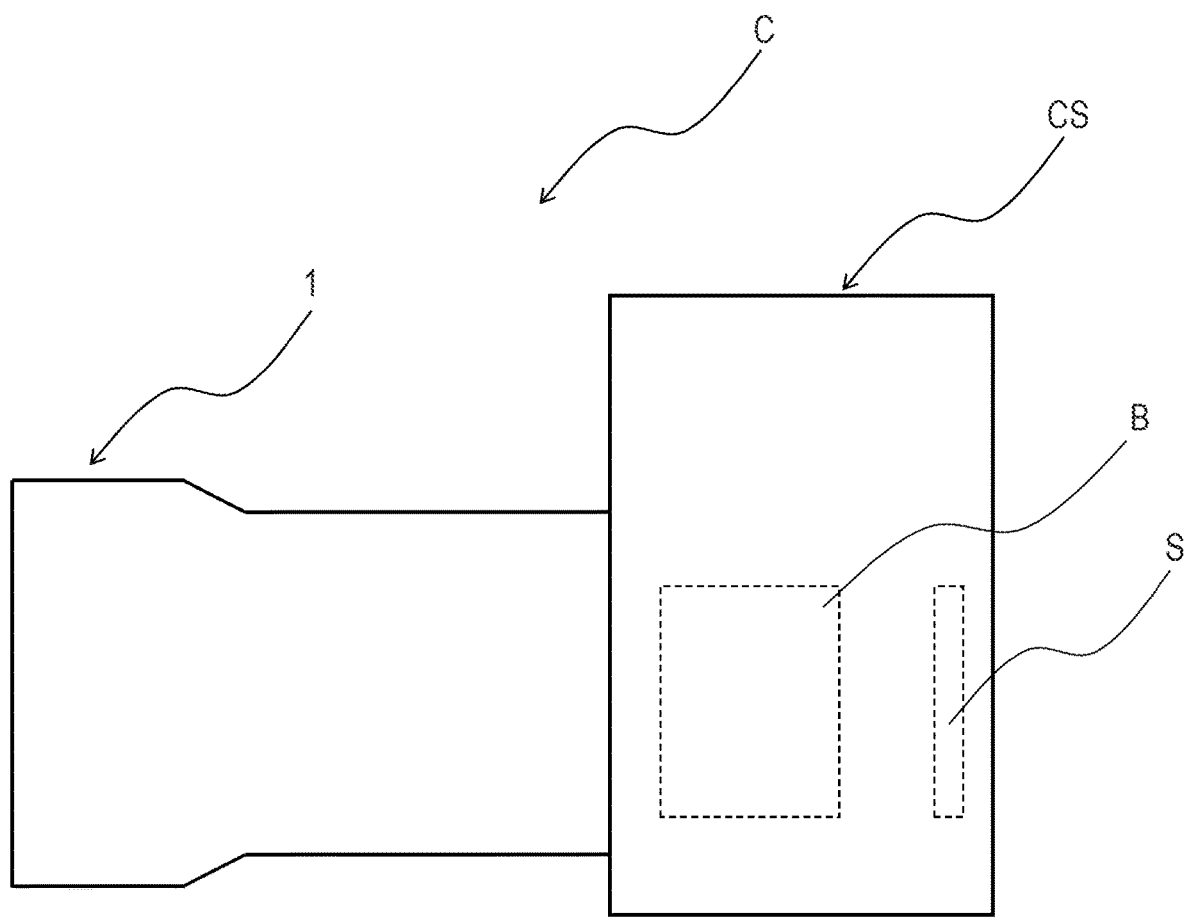
FIG. 5 is an image pickup apparatus including the lens apparatus of the present invention.

Furthermore, it is possible to provide an image pickup apparatus including a lens apparatus according to the respective embodiments and a camera (a main body of the image pickup apparatus) having an image pickup element which receives an optical image formed by the lens apparatus. Thus, it is possible to provide an image pickup apparatus which can reduce the instability of the optical performance FIG. 5 illustrates an image pickup apparatus C according to the present example. The image pickup apparatus C includes a camera CS (main body of the image pickup apparatus) having an image pickup element S. In addition, the image pickup apparatus C can include a controller B which controls the movement of optical members of the lens apparatus 1 in the optical axis direction. Note that the lens apparatus 1 may be attached to and detached from the camera CS, and that the controller B may be included in the camera CS or may be included in the lens apparatus 1.

A preferred embodiment of the present invention has been described above. However, the present invention is not limited to this embodiment and is capable of various changes and modifications within the scope of the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-083807, filed Apr. 20, 2017, which is hereby incorporated by reference herein in its entirety.

What is claimed is:

1. A lens apparatus comprising:
   a first barrel configured not to be moved and including a plurality of first guide grooves formed in the first barrel;
   a second barrel fitted to an inside of the first barrel and configured to be moved relative to the first barrel, the second barrel including a plurality of second guide grooves formed in the second barrel;
   a moving barrel including cam followers engaged with the first guide grooves and the second guide grooves, and configured to be moved in a direction of an axis of the second barrel by the first barrel and the second barrel rotating relative to each other; and
   an elastic member fixed to an outer surface of the first barrel, and biasing an outer surface of the second barrel to an inner surface of the first barrel through a bore formed in the first barrel by pressing the outer surface of the second barrel between two of the plurality of second guide grooves formed in the second barrel.

2. The lens apparatus according to claim 1, wherein
   the elastic member has a shape extending in a direction orthogonal to an axis of the first barrel, and
   one end of the elastic member is fixed to the first barrel and the other end of the elastic member biases the second barrel.

3. The lens apparatus according to claim 2, wherein
   the apparatus comprises two of the elastic member, and two of the other end respectively corresponding to the two of the elastic member are disposed between two of the one end respectively corresponding to the two of the elastic member.

4. The lens apparatus according to claim 1, wherein
   the elastic member biases the outer surface in one of two ranges obtained by dividing an outer circumference surface of the second barrel with a plane including the axis of the second barrel.

5. The lens apparatus according to claim 4, wherein
   the elastic member biases the outer circumference surface in an upper range of the two ranges obtained by dividing the outer circumference surface with the plane with respect to a vertical direction.

6. The lens apparatus according to claim 1, wherein
   the apparatus comprises a plurality of ones of the elastic member.

7. The lens apparatus according to claim 6, wherein
   the plurality of ones of the elastic member biases the outer surface respectively at a plurality of portions thereof being different from each other.

8. The lens apparatus according to claim 6, wherein
   the plurality of ones of the elastic member are provided away from each other in a direction of an axis of the first barrel.

9. The lens apparatus according to claim 6, wherein
   the plurality of ones of the elastic member are provided away from each other around an axis of the first barrel.

10. The lens apparatus according to claim 1, wherein the elastic member includes a leaf spring.

11. The lens apparatus according to claim 1, wherein a length of the elastic member in a direction orthogonal to an axis of the first barrel is longer than a length of the elastic member in a direction of the axis.

12. The lens apparatus comprising according to claim 1, wherein
    the elastic member extends in a direction orthogonal to an axis of the first barrel.

13. The lens apparatus according to claim 12, further comprising a mount member connectable to a body of an image pickup apparatus,
    wherein the first barrel is fixed to the mount member.

14. An image pickup apparatus comprising:
    a lens apparatus comprising:
    a first barrel configured not to be moved and including a plurality of first guide grooves formed in the first barrel;
    a second barrel fitted to an inside of the first barrel and configured to be moved relative to the first barrel, the second barrel including a plurality of second guide grooves formed in the second barrel;
    a moving barrel including cam followers engaged with the first guide grooves and the second guide grooves, and configured to be moved in a direction of an axis of the second barrel by the first barrel and the second barrel rotating relative to each other; and
    an elastic member fixed to an outer surface of the first barrel, and biasing an outer surface of the second barrel to an inner surface of the first barrel through a bore formed in the first barrel by pressing the outer surface of the second barrel between two of the plurality of second guide grooves formed in the second barrel, and an image pickup element configured to receive an image formed by the lens apparatus.

* * * * *